(12) United States Patent
Taguchi et al.

(10) Patent No.: US 6,598,933 B2
(45) Date of Patent: Jul. 29, 2003

(54) VEHICLE FRONT BODY STRUCTURE

(75) Inventors: Yoshinori Taguchi, Wako (JP); Kenichiro Soyama, Wako (JP); Masuhiro Saito, Wako (JP); Fumiko Saito, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/164,769

(22) Filed: Jun. 6, 2002

(65) Prior Publication Data

US 2003/0025358 A1 Feb. 6, 2003

(30) Foreign Application Priority Data

Aug. 1, 2001 (JP) ........................................ 2001-234271

(51) Int. Cl.[7] ............................................... B62D 25/08
(52) U.S. Cl. .................. 296/203.02; 296/194; 296/198; 296/189
(58) Field of Search ................................. 296/194, 198, 296/203.01, 203.02, 203.03, 205, 188, 189

(56) References Cited

U.S. PATENT DOCUMENTS 6,068,330 A * 5/2000 Kasuga et al. .............. 296/189
6,099,071 A * 8/2000 Kasuga et al. .............. 296/205
6,409,255 B2 * 6/2002 Tilsner et al. ............... 296/194
6,416,119 B1 * 7/2002 Gericke et al. ............. 296/205

FOREIGN PATENT DOCUMENTS

| JP | 63263175 A | * | 10/1988 | ........... B62D/25/08 |
| JP | 03032986 A | * | 2/1991 | ........... B62D/25/08 |
| JP | 04002579 A | * | 1/1992 | ........... B62D/25/08 |
| JP | 2516212 | | 4/1996 | |

* cited by examiner

Primary Examiner—D. Glenn Dayoan
Assistant Examiner—Patricia Engle
(74) Attorney, Agent, or Firm—Merchant & Gould, P.C.

(57) ABSTRACT

A vehicle front body structure including a framework member provided at a front end of an upper member which extends forwardly from a front pillar closest to a driver's seat. The framework member includes an inclined portion which extends forward over and beyond a front wheel, and a vertical portion which extends from a front end of the inclined portion in such a manner as to be suspended in front of the front wheel. When, in a collision between vehicles, a front side member of an oncoming vehicle collides with own vehicle at a position outside a front side member in a vehicle widthwise direction, a resulting impact is alleviated by the framework member, precluding the front pillar from being exerted with an excessive amount of impact force.

4 Claims, 9 Drawing Sheets

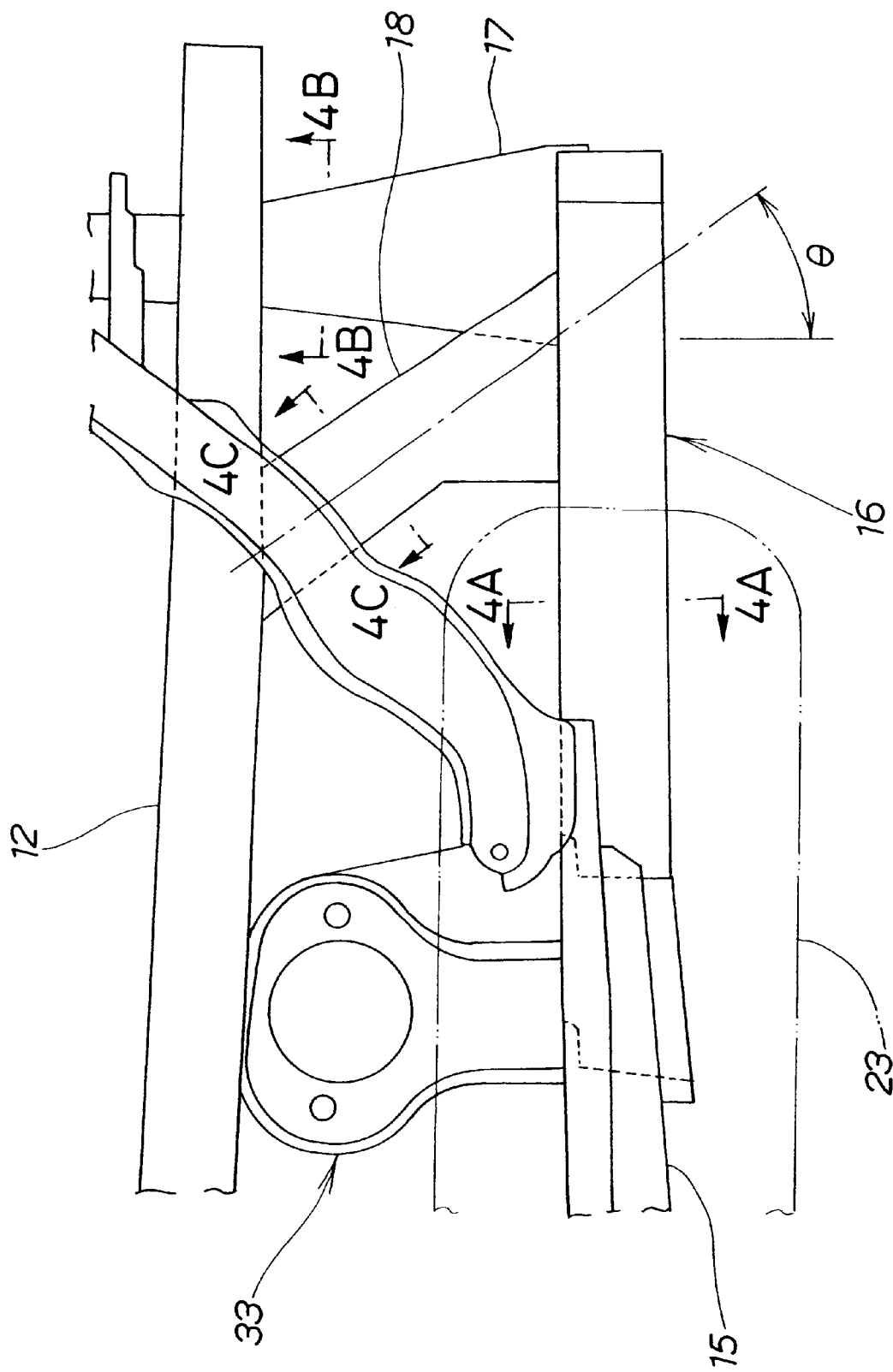

(Preferred Embodiment)

VEHICLE FRONT BODY STRUCTURE

FIELD OF THE INVENTION

The present invention relates to a front body structure of a vehicle which in an offset collision, is capable of reliably absorbing an impact or shock of the collision, thereby limiting deformation of a passenger compartment.

BACKGROUND OF THE INVENTION

A vehicle front body structure of a vehicle designed to mitigate an impact or shock of a collision is known, for instance, from Japanese Patent No. 2516212 entitled "FRONT BODY STRUCTURE OF MOTOR VEHICLE".

In the known vehicle front body structure, a front side frame is arranged to extend in a fore and aft direction of a vehicle body. An apron frame is formed in a curved shape along an upper edge portion and a front edge portion of a wheel house provided at the front side frame, while a front portion of the apron frame is arranged to extend in a forward area of the vehicle body. The front portions of the front side frame and the apron frame are interconnected through a reinforcement member.

For example, while in the event that a side frame or a bumper beam of another vehicle collides with the apron frame at a position displaced from the front side frame, the apron frame absorbs a collision impact through deformation of the apron frame, in a case where due to the presence of a side frame and a bumper beam of an oncoming vehicle involved in the collision being located at high position to cause the side frame and the bumper beam to be placed offset in an upper part of the apron frame, the oncoming vehicle rides on the upper part of the apron frame, rendering the apron frame incapable of adequately absorbing the impact.

Consequently, it is desired to absorb the impact of the collision for thereby providing limited deformation of the passenger compartment even when the own vehicle encounters an offset collision with the oncoming vehicle in a manner in which the side frame (side member) of the counter vehicle is displaced from the side member of the own vehicle.

SUMMARY OF THE INVENTION

According to the present invention, there is provided a front body structure of a vehicle having a pair of right and left front wheels and a pair of right and left front pillars, which front body structure comprises: a pair of left and right side members disposed inside the front wheels and extending forwardly from a passenger compartment; a framework member having an extension extending forwardly over and beyond one of the front wheels and a suspended portion extending substantially downright from a forward end of the extension and suspended in front of the one front wheel; and an upper member extending forwardly from that one of the front pillars which is closer to the one wheel, the framework member being mounted to a front end of the upper member.

When, in a collision of two vehicles, the distal end of the side member and the bumper beam of the counter vehicle collides with the own vehicle at a position outside the side member of the own vehicle in the widthwise direction thereof, the framework member is capable of alleviating the impact of the collision for protecting the front pillar from being imparted with an excessive magnitude of impact, thereby providing limited deformation of the passenger compartment. Further, the presence of the framework member having the suspended portion enables the side member and the bumper beam to be more precisely brought into striking abutment with the framework member even in the presence of differences in height with respect to the side member and the bumper beam of the oncoming vehicle involved in the collision, providing capability to more reliably suppress deformation of the passenger compartment.

Preferably, a lower end of the suspended portion is connected to a respective one of the side members via a lower end connecting member. This allows the lower end connecting member to increase rigidity of the framework member, particularly, the rigidity resisting loads that would be imparted in the widthwise direction of the vehicle, while unitarily forming the framework member and the side member enables the framework member to more easily absorb the impact of the collision.

It is also preferred that the framework member and a respective one of the side members are interconnected via an inclined connecting member that is inclined such that one side mounted to the framework member is positioned a distance ahead of the other side mounted to the side member. The inclined connecting member is effective for imparting increased rigidity to the framework member in the fore and aft direction of the vehicle body, enabling the framework member and the side member to more easily absorb the collision impact.

BRIEF DESCRIPTION OF THE DRAWINGS

Certain preferred embodiments of the present invention will be described in detail below, by way of example only, with reference to the accompanying drawings, in which:

FIG. 3 is a top plan view illustrating, on an enlarged scale, a portion of the vehicle front body structure shown in FIG. 1;

FIG. 10A is a schematic side elevational view of the preferred embodiment, illustrating a bumper beam of the counter vehicle colliding with lower and upper portions of the framework member, while FIG. 10B is a similar view but illustrating a conventional vehicle involved in an offset collision.

DETAILED DESCRIPTION OF THE PREFERRED EMBODIMENTS

Figure 1:
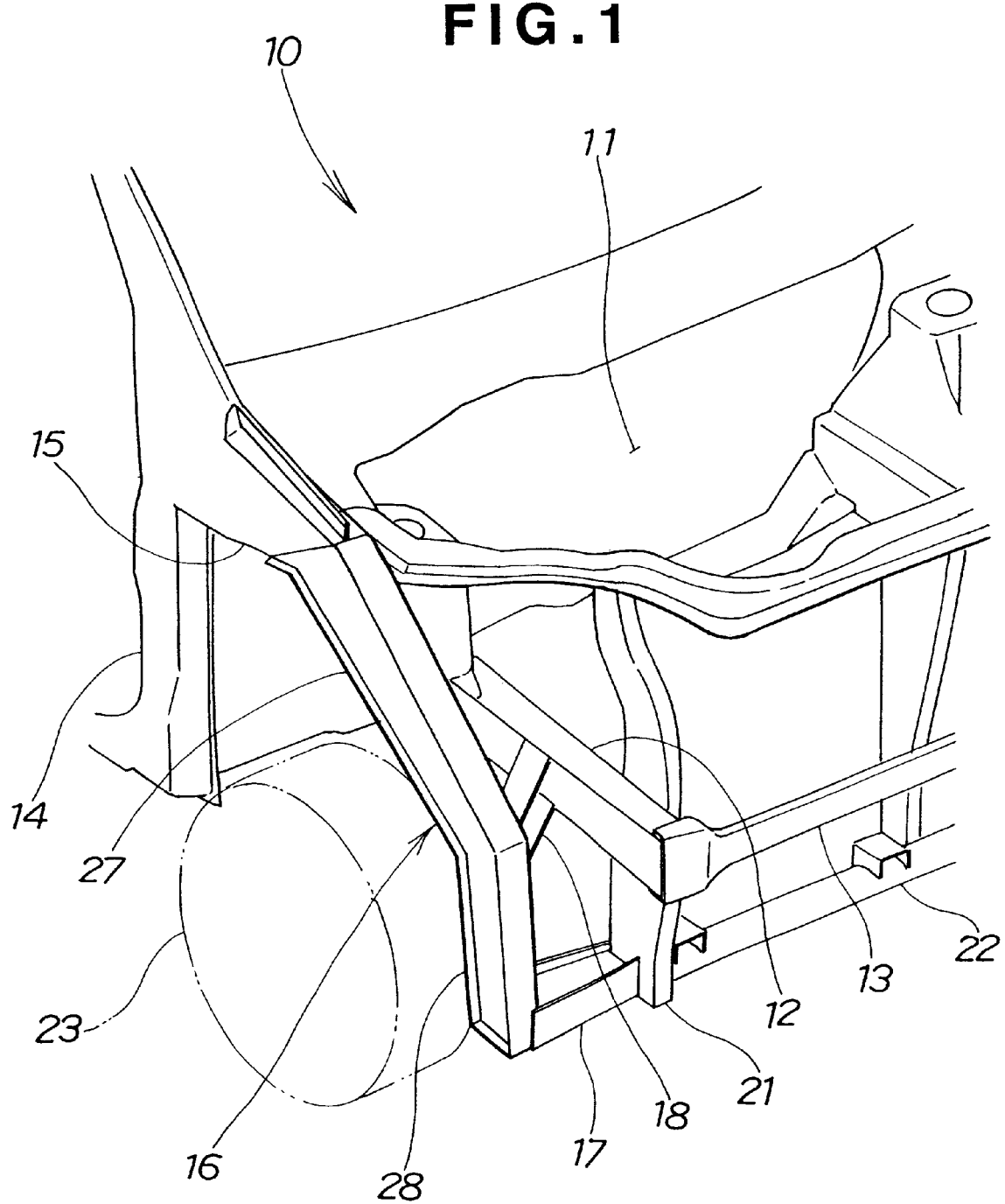
FIG. 1 is a perspective view illustrating a portion of a vehicle front body structure according to the present invention.

Referring to FIG. 1, a front body 10, which serves as a vehicle front body portion of a vehicle, is shown having a pair of left and right front side members 12 (only one shown), serving as side members, respectively, which extend in front of a floor panel (not shown) of a passenger compartment toward the vehicle front body portion via a lower area of a dash panel 11 which separates the passenger compartment and an engine compartment from one another. A bumper beam 13 is mounted to distal ends of the front side members 12 so as to extend across therebetween. A pair of left and right upper members 15 (only one shown) extend forward from front pillar lowers 14 (only one shown) which serve as front pillars, respectively. A framework member 16 of the present invention is mounted to a distal end of one (closest to a driver's seat) of the upper members 15. The framework member 16 is connected to both a first connecting member 17, which serves as a lower end coupling member extending from the front side member 12, and a second connecting member 18 which serves as an inclined coupling member.

A pair of left and right side down members 21 (only one shown) extend downward from respective distal ends of the front side members 12. Connected to the side down member 21 is one end of the first connecting member 17. Reference numeral 22 denotes a bulk head lower beam spanning between the left and right side down members 21. Reference numeral 23 denotes one of front wheels.

Figure 2:
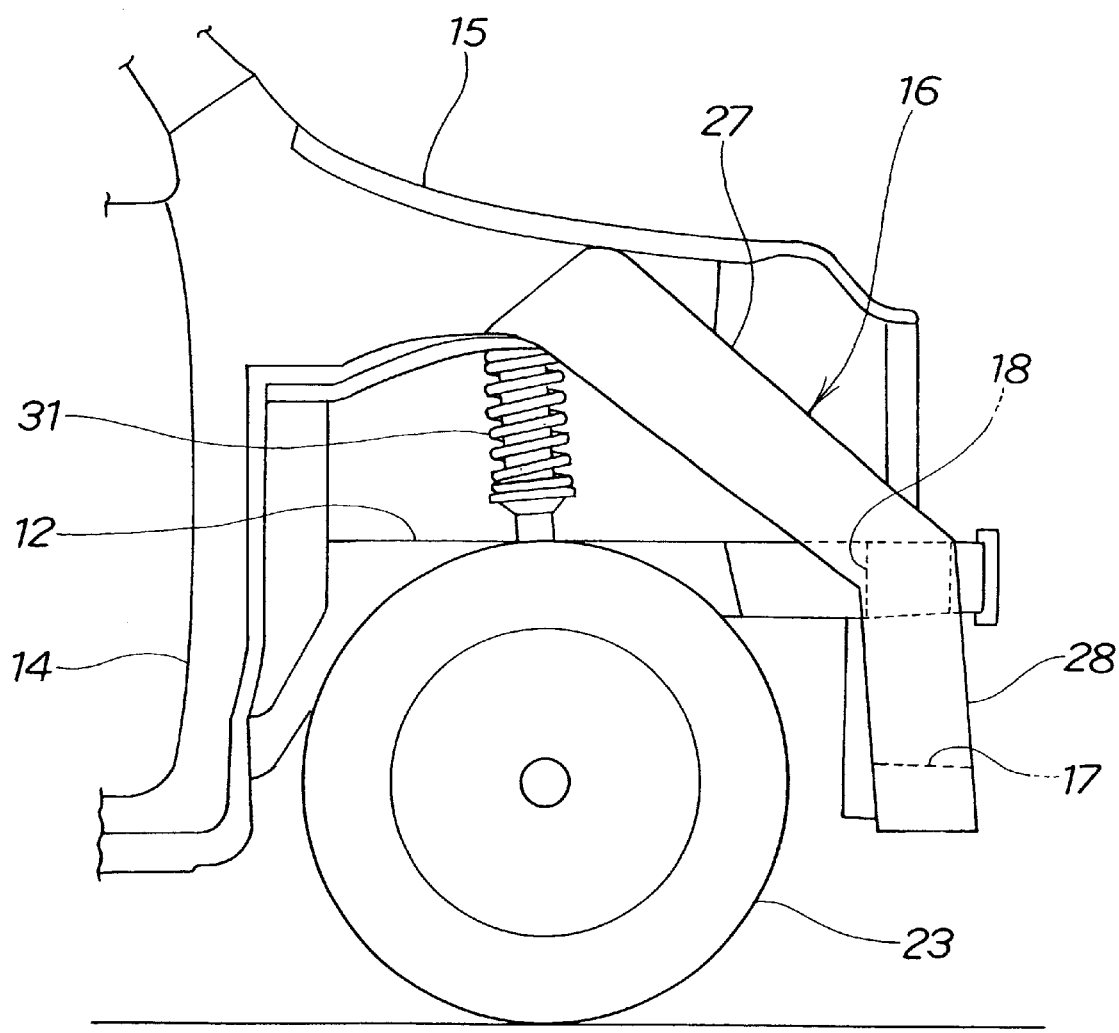
FIG. 2 is a side elevational view illustrating the vehicle front body structure shown in FIG. 1.

As shown in FIG. 2, the framework member 16 is comprised of an inclined portion 27, which serves as an extension inclined downwardly from the upper member 15 in a forward direction, and a vertical portion 28 which serves as a suspended portion substantially vertically extending downward at a distal end of the inclined portion 27. A lower end of the vertical portion 28 is connected to the first connecting member 17 and an upper end of the vertical portion 28 is connected to the second connecting member 18. Reference numeral 31 denotes a strut composed of a damper and a spring for alleviating impacts to be exerted to the vehicle body from the front wheel 23.

As shown in FIG. 3, the front side member 12 and the framework member 16 are connected to the first connecting member 17 and the second connecting member 18 which extend outward from the side member 12 in a vehicular widthwise direction. The second connecting member 18 is inclined such that one side, which is connected to the framework member 16 is placed at a distance ahead of the other side which is connected to the front side member 12. Reference numeral 33 is a strut mount segment to which an upper end of the strut 31 shown in FIG. 2 is mounted.

Figure 4A:
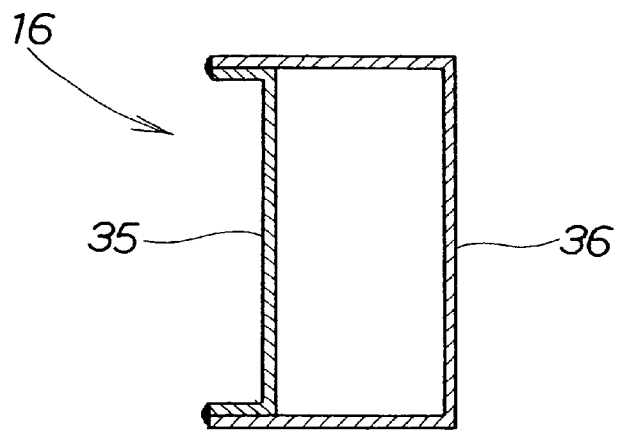
FIG. 4A is a cross sectional view of a framework member, taken along line 4A—4A of FIG. 3.
Figure 4B:
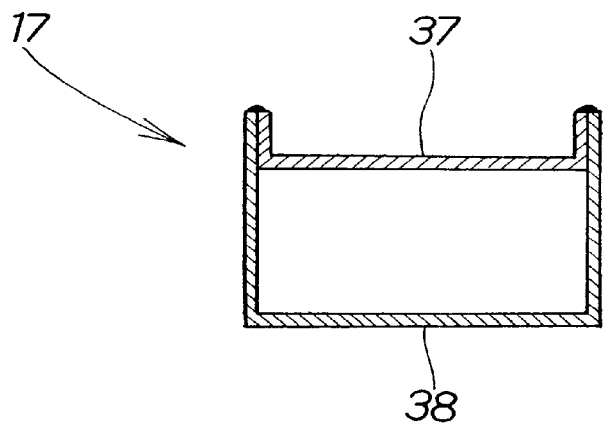
FIG. 4B is a cross sectional view of a first connecting member, taken along line 4B—4B of FIG. 3.
Figure 4C:
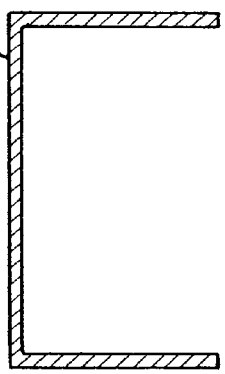
FIG. 4C is a cross sectional view of a second connecting member, taken along line 4C—4C of FIG. 3.

FIGS. 4A to 4C show respectively in cross section the framework member 16, the first connecting member 17 and the second connecting member 18.

As shown in FIG. 4A, the framework member 16 is a component part configured in a closed cross sectional structure formed by permitting left and right C-shaped components 35, 36 in cross section to be mated to one another.

FIG. 4B shows in cross section the first connecting member 17. The first connecting member 17 is a component part configured in a closed cross-sectional structure formed by permitting upper and lower C-shaped components 37, 38 to be mated to one another.

FIG. 4C shows in cross section the second connecting member 18. The second connecting member 18 is a C-shaped component part.

Now, operation of the vehicle front body structure in the offset collision is described below with reference to FIGS. 5A to 9.

Figure 5A:
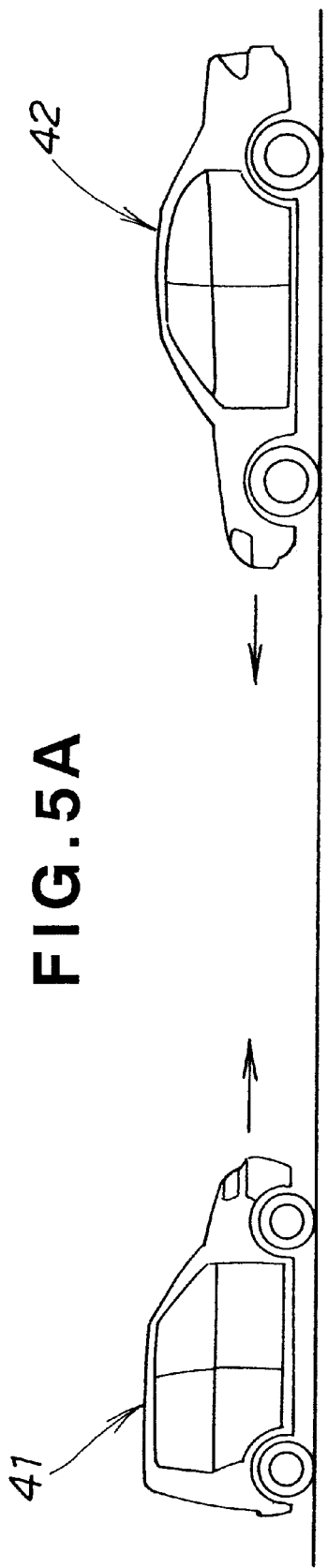
FIGS. 5A and 5B are views illustrating two vehicles which are about to get involved in an offset collision.

FIG. 5A shows an offset collision test conducted with the vehicle 41 and the vehicle 42 held in opposed relation to each other and advanced in directions as arrowed.

The vehicle 41 is provided as a test vehicle (e.g., a light vehicle) having the framework member 16 shown in FIG. 2, while the vehicle 42 is provided, for instance, as a colliding vehicle which is larger in size than the test vehicle 41.

Figure 5B:
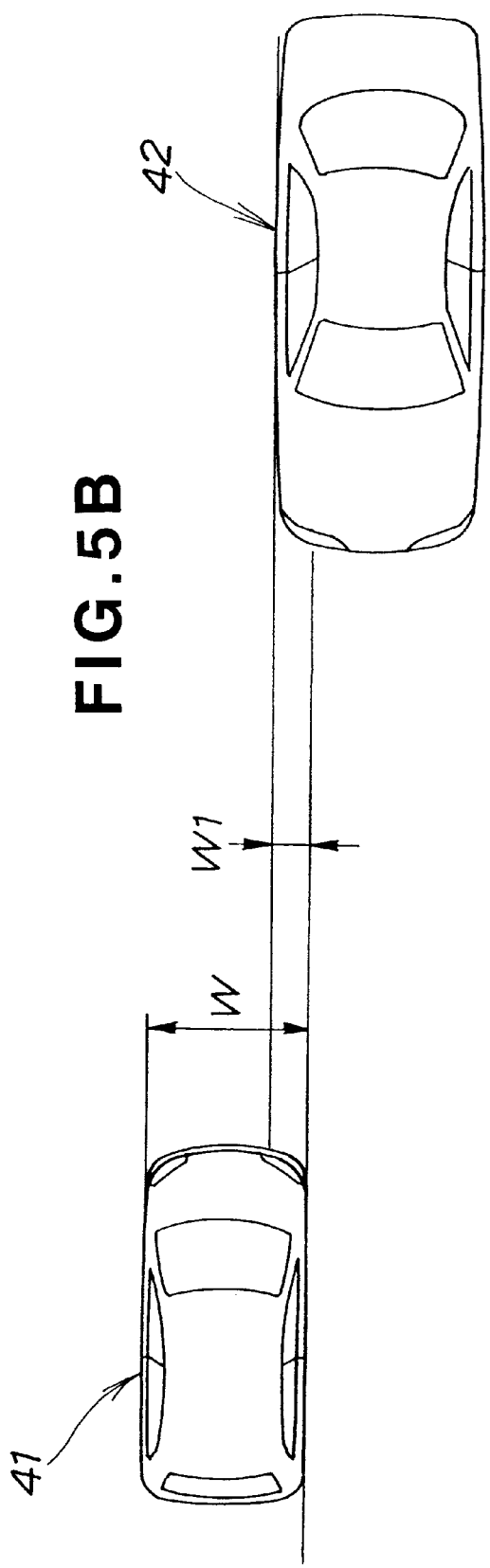

Shown in FIG. 5B is a situation in which an offset impact test condition has been preset to cause the vehicles 41, 42 to be brought into collision under a circumstance in which both vehicles 41, 42 are overlapped in side portions closest to the driver seats (positioned in right sides in this case) with an overlapped amount of W1 chosen at a given ratio relative to a maximum width of W (except for door mirrors) of the vehicle 41. By choosing the overlapped amount of W1 to be smaller than the maximum width W of the vehicle 41, a result of the framework member 16 provided in the vehicle 41 is evaluated.

Figure 6:
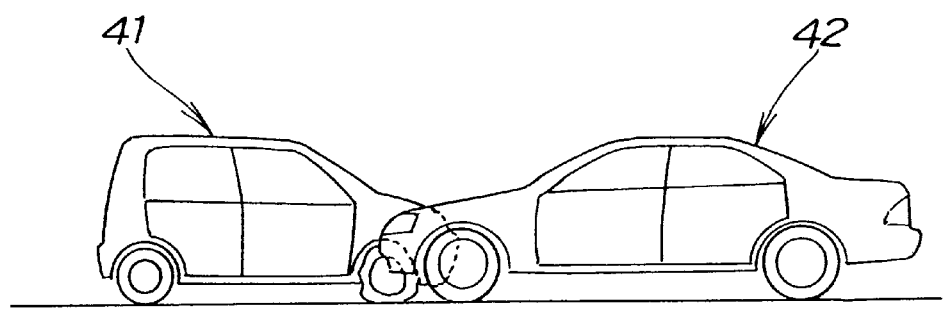
FIG. 6 is a view illustrating two vehicles in an offset collision.

FIG. 6 illustrates a condition immediately after a right front portion of the vehicle 41 and a right front portion of the vehicle 42 are brought into collision. The vehicle 42 collided with the right front portion of the vehicle 41 and intruded into the vehicle 41.

Figure 7:
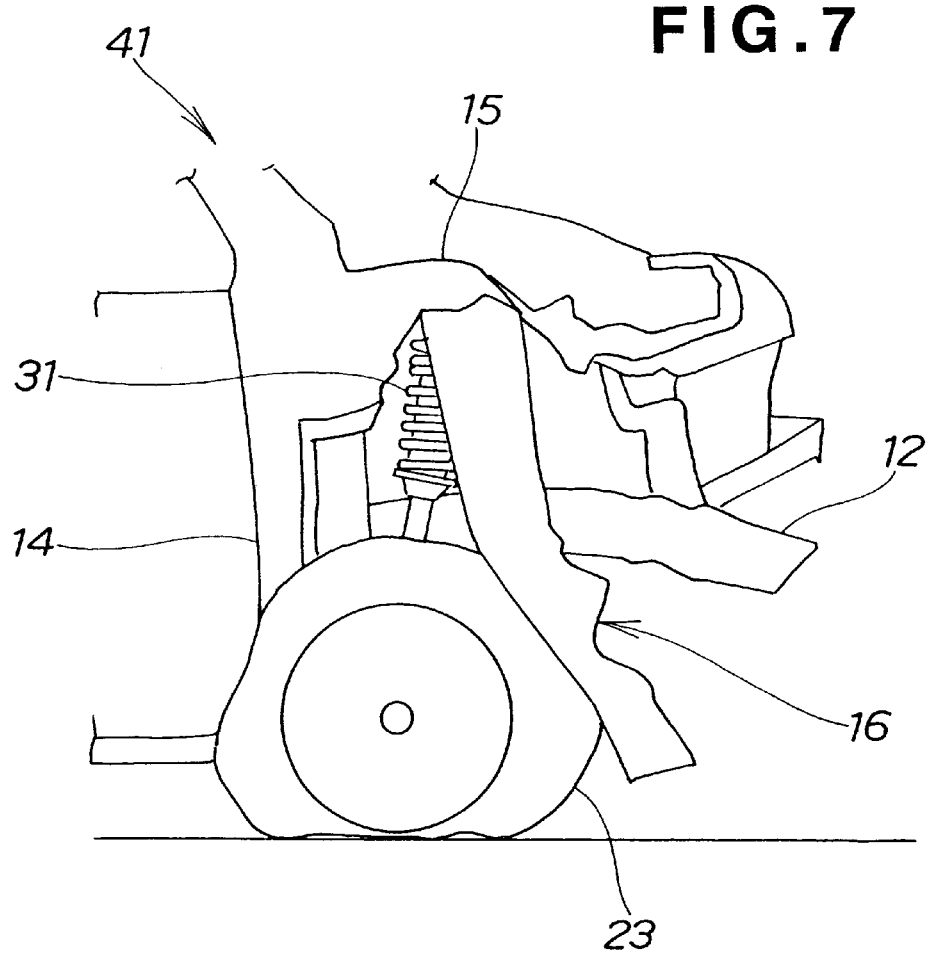
FIG. 7 is a view illustrating a vehicle front body structure of one of the vehicles involved in the offset collision shown in FIG. 6.

FIG. 7 shows a resulting state of the right front portion of the vehicle 41 involved in the collision shown in FIG. 6 under a condition with a front fender removed.

The framework member 16 of the vehicle 41 is deformed in the aft direction of the vehicle and strikes against a front portion of the front wheel 23. The front wheel 23 is pushed rearwardly of the vehicle body and brought into striking abutment with the front pillar floor 14.

Figure 8A:
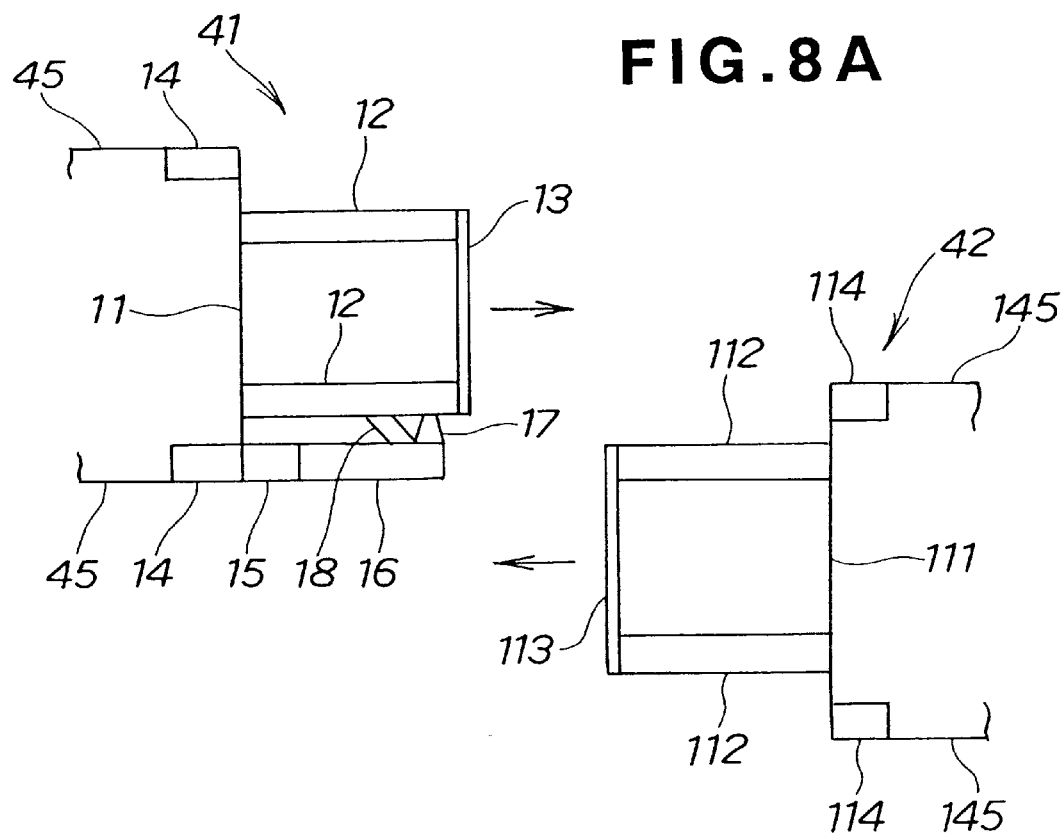
FIGS. 8A and 8B are schematic top plan views of two vehicles before and after they get involved in an offset collision.
Figure 8B:
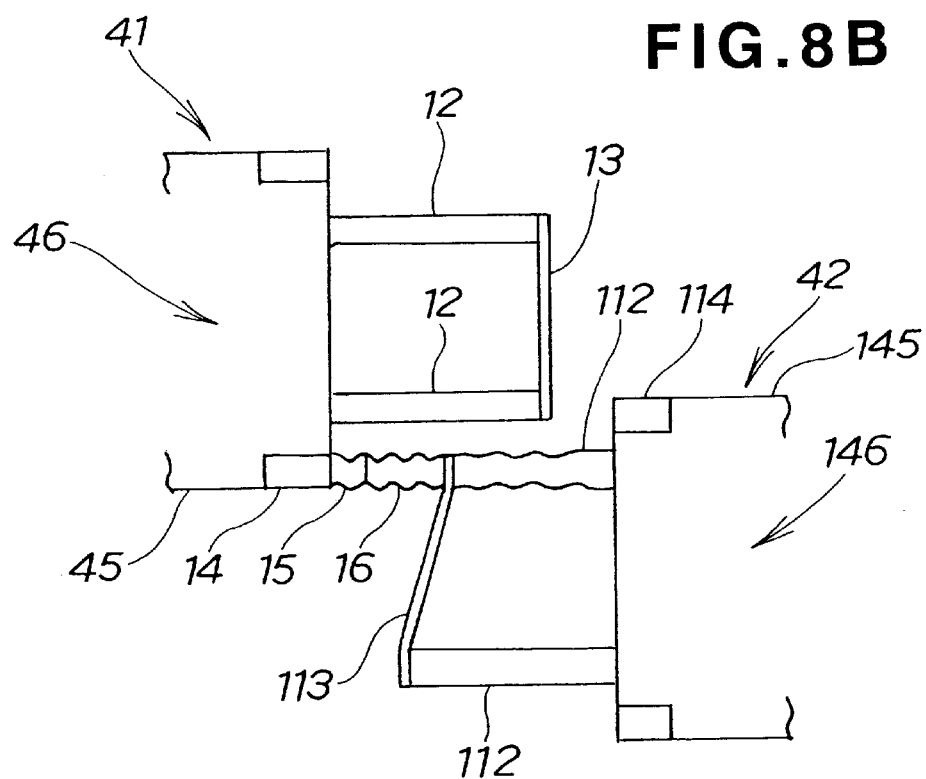

FIGS. 8A and 8B schematically illustrate the front portions of the vehicles 41 and 42. More specifically, FIG. 8A shows a state prior to the offset impact collision, while FIG. 8B shows the vehicles 41 and 42 involved in the offset impact collision.

As shown in FIG. 8A, the vehicle 41 includes the pair of left and right front side members 12, 12 which extend from the dash panel 11 forwardly of the vehicle. The bumper beam 13 is mounted to the distal ends of the front side members 12, 12. The upper member 15 extends forwardly from one of the left and right front pillar lowers 14, 14, to one of which the framework member 16 is mounted. The first connecting member 17 and the second connecting member 18, which extend from one of the front side members 12, 12, are connected to the framework member 16. Reference numerals 45, 45 denote front doors mounted to the respective front pillars 14, 14 and capable of opening and closing actions.

The vehicle 42 has substantially the same structure as the vehicle 41 and includes a dash panel 111, front side members 112, 112, a bumper beam 113, front pillars 114, 114 and front doors 145, 145.

As shown in FIG. 8B, when one of the front side members 112 of the vehicle 42 collides (practically via the bumper beam 113) with the framework member 16 of the vehicle 41 such that the front side member is displaced outwardly from the front side member 12 of the vehicle 41 in the vehicular widthwise direction, the framework member 16 is deformed in the vehicle 41, thereby absorbing the impact of the collision. As a result, the front pillar lower 14 of the vehicle 41 is not exerted with an excessive amount of impact, thereby keeping deformation of the front pillar lower 14, deformation of the front door 45 and hence deformation of a passenger compartment 46 to a minimum.

Further, because the framework member 16 of the vehicle 41 absorbs not only the collision impact applied thereto but also the collision impact applied to the vehicle 42 collided, deformation of the vehicle 42, e.g., the front door 145 and the passenger compartment 146 can be kept to a minimum.

Figure 9:
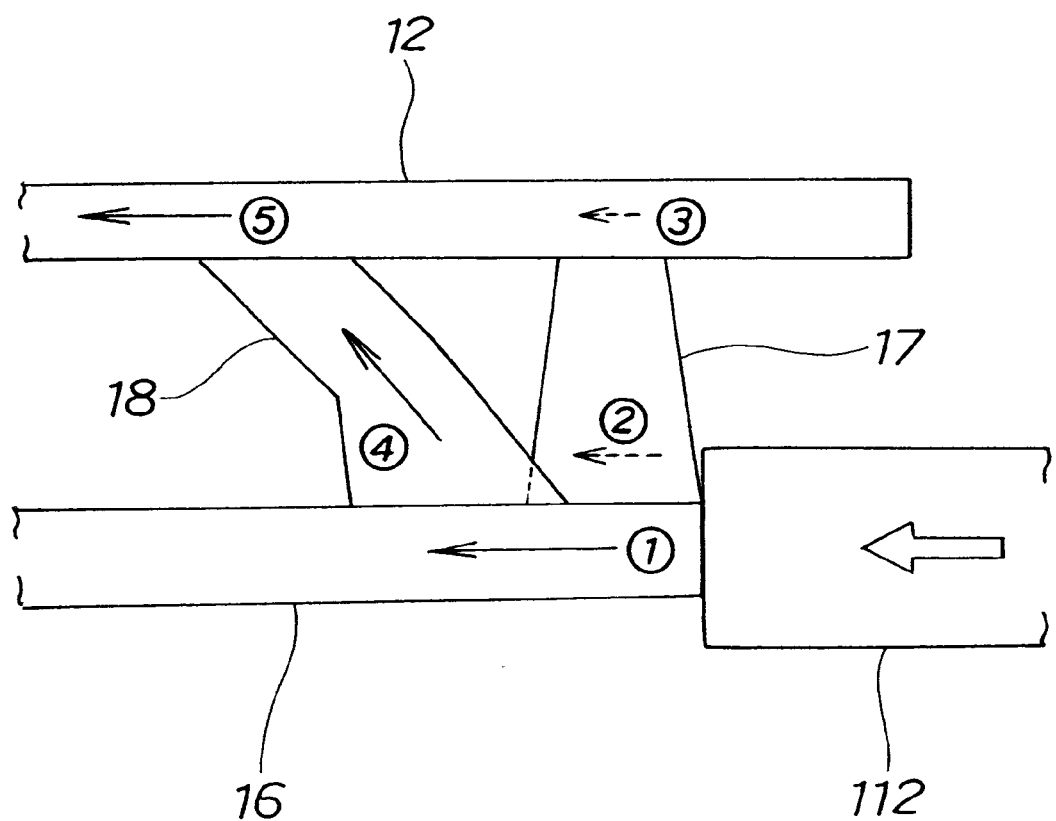
FIG. 9 is a schematic view illustrating how impact forces are transferred.

Reference is now made to FIG. 9 showing how the first connecting member 17 and the second connecting member 18 result from the offset collisions.

As shown in FIG. 9, as the front side member 112 is brought into striking abutment with the framework member 16 in a direction as shown by a white arrow and the framework member 16 encounters the impact in a direction as shown by arrow ①, the impact is transferred to the first connecting member 17, with which the framework member 16 and the front side member 12 are connected, in a direction as shown by arrow ② indicated by a dotted line and is transferred to the front side member 12 in a direction as shown by an arrow ③ indicated by a dotted line, resulting in consequences for not only the framework member 16 but also the front side member 12 to bear the impact.

Since the impact can be transferred from the framework member 16 to the front side member 12 via the second connecting member 18 as shown by arrows ④, ⑤ in a more smooth fashion than that transferred through the first connecting member 17, the impact can be born with the front side member 12, thereby enabling the framework 16 and the front side member 12 to sustain a further increased impact and to absorb the same.

Figure 10:
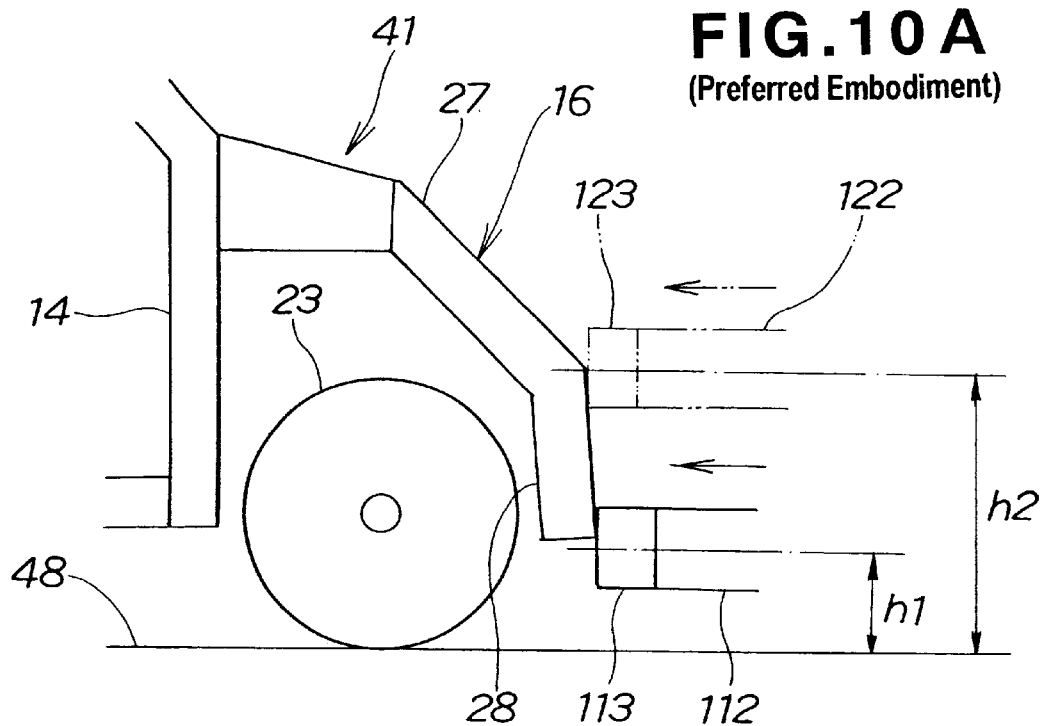
Figure 10:
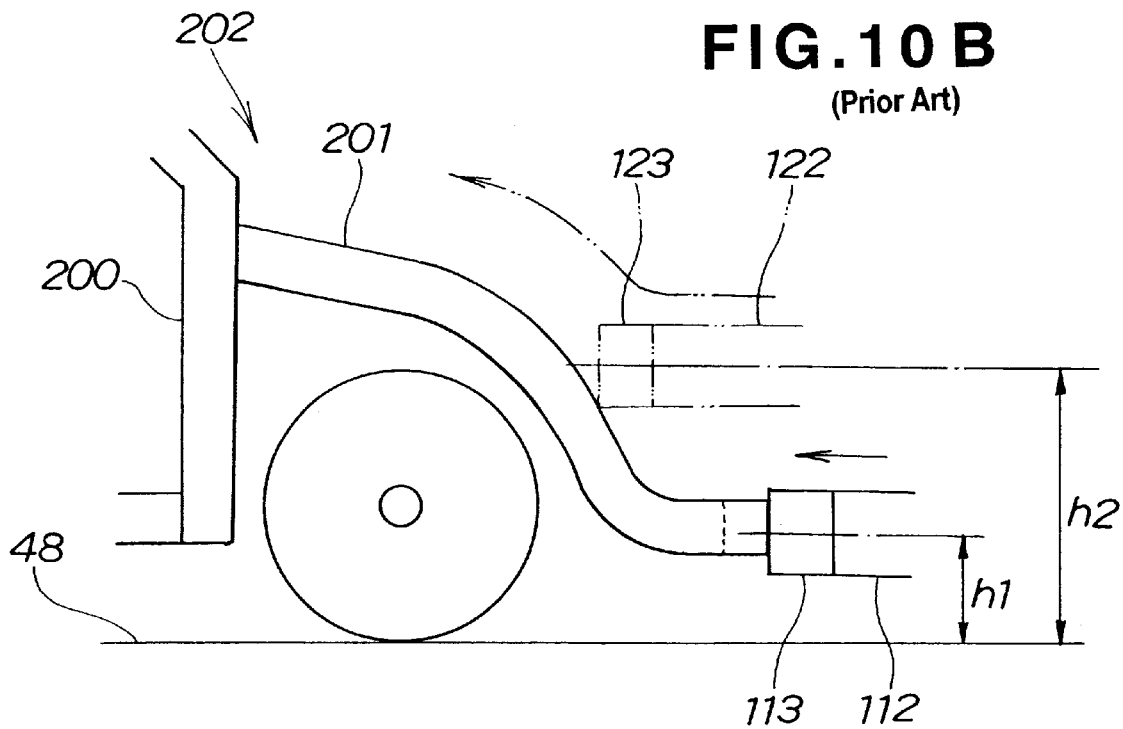

Reference is made next to FIG. 10A illustrating the other vehicle colliding with the framework member according to the preferred embodiment, and FIG. 10B illustrating the other vehicle colliding with the framework member of a comparative example.

In FIG. 10A, when the vehicle 41 encounters a collision with the bumper beam 113 and the front side member 112, which have a height of h1 from the ground 48, of the other vehicle, or when the vehicle 41 encounters a collision with a bumper beam 123 and a front side member 122, which have a height of h2 from the ground 48 higher than the height of h1, of the other vehicle, the impact arising from the collision can be born with the longitudinally lengthwise vertical portion 28, which forms part of the framework member 16, to be absorbed thereby. That is, even in the presence of a differential height of the front bumper of the oncoming vehicle involved in the collision, the bumper beam 123 of the front bumper of the oncoming vehicle can be more reliably brought into striking abutment with the framework member 16 of the own vehicle to enable the impact to be further easily absorbed.

In the comparative example of FIG. 10B, when a vehicle, which has an apron frame 201 extending forwardly from a front pillar 200, encounters a collision with the bumper beam 113 and the front side member 112 which have a height of h1 from the ground 48, the bumper beam 113 and the front side member 112 are brought into striking abutment with the apron frame 201 to cause the resulting impact to be absorbed by the apron frame 201. However, it is conceivable that, when the vehicle 202 encounters a collision with, for instance, the bumper beam 123 and the front side member 122 which have a height of h2 from the ground 48, the bumper beam 123 is not brought into striking abutment with the distal end of the apron frame 201 to cause the bumper beam 123 and the front side member 122 to ride on the apron frame 201, which is consequently unable to absorb the impact caused by the collision for thereby inducing the passenger compartment to be deformed.

While, in the preferred embodiment, the framework member has been shown as an example which is structured with the extension and the vertical portion which form two linear components, the present invention is not limited thereto, and the framework member may be composed of a curved member which extends over an upper part of the front wheel and which hangs in front of the front wheel, or may be composed of a member including a curved component and a linear component.

Further, in the present invention, the framework member may be mounted to the front end of the upper member, which is extended forwardly from the front pillar as a separate component, or may be formed in a unitary structure with the upper member.

As explained above, first, the present invention is characterized in that, in the vehicle 41 in which the left and right front side members 12, 12 are arranged to extend forward from the passenger compartment 46 and the respective front wheels 23 are located outside the front side members 12, 12, the framework member 16 including the inclined portion 27, which extends across the upper area of the front wheel 23, and the vertical portion 28, which hangs down from the front distal end of the inclined portion 27 in the substantially vertical direction to assume a position ahead of the front wheel 23, is provided at the front distal end of the upper member 15 which is arranged to extend forward from the front pillar lower 14 of the vehicle 41.

In a case where the vehicles 41, 42 collides with each other such that, in the collisions of the vehicles 41, 42, the front side member 112 and the bumper beam 113 of the oncoming vehicle are placed offset outwardly with respect to the front side member 12 of the own vehicle in the vehicular widthwise direction, the framework member 16 alleviates the impact to preclude the front pillar lower 14 from being exerted with an excessive amount of impact, thereby ensuring limited deformation of the passenger compartment 46. Further, the presence of the framework member 16 provided with the vertical portion 28 enables the front side member and the bumper beam to be reliably brought into abutting contact with the framework member 16 to preclude the deformation of the passenger compartment 46 in a further reliable manner.

Second, the present invention concerns a feature in that the lower distal end of the framework member 16 is connected to the front side member 12 via the first connecting member 17.

It is possible for the rigidity of the framework member 16, i.e. the rigidity that resists the load to be imparted especially in the vehicular widthwise direction, to be increased by the first connecting member, and the presence of the framework member 16 formed with the front side member 12 in a unitary structure enables a more reliable absorption of the impact of the collision.

Third, the present invention concerns a feature in which the second connecting member 18 extends between the framework member 16 and the front side member 12 in an inclined state such that one side mounted to the framework member 16 is placed a distance ahead of the other side mounted to the front side member 12.

The presence of the second connecting member 18 enables the framework member 16 to have an increased rigidity in a vehicle lengthwise direction, enabling the impact of the collision to be more easily absorbed with the framework member 16 and the front side member 12.

The present disclosure relates to the subject matter of Japanese Patent Application No. 2001-234271, filed Aug. 1, 2001, the disclosure of which is incorporated herein by reference in its entirety.

What is claimed is:

1. A front body structure of a vehicle having a pair of right and left front wheels and a pair of right and left front pillars, said front body structure comprising:

a pair of left and right side members disposed inside the front wheels and extending forwardly from a passenger compartment;

an upper member extending forwardly from one of the front pillars; and a framework member mounted to a forward end of said upper member, the framework member having an inclined portion sloping downward from the upper member in a forward direction and serving as an extension of the upper member extending forwardly over and beyond one of the front wheels that is closer to the front pillar from which the upper member extends, and a suspended vertical portion extending substantially vertically downward from a forward end of said inclined portion and suspended in front of the respective front wheel.

2. A front body structure according to claim 1, further comprising a lower end connecting member interconnecting a lower end of said suspended vertical portion and a respective one of said side members.

3. A front body structure according to claim 1, further comprising a connecting member interconnecting said framework member and a respective one of said side members, said connecting member being inclined such that one side mounted to the framework member is positioned a distance ahead of the other side mounted to the respective side member.

4. A front body structure according to claim 1, wherein a lower end of said suspended vertical portion of the framework member is located at a lower level than said side members.

* * * * *